US006174552B1

(12) United States Patent
Nissinen et al.

(10) Patent No.: US 6,174,552 B1
(45) Date of Patent: Jan. 16, 2001

(54) METHOD FOR IMPROVING THE SINKABILITY OF FISH FOOD PELLETS

(76) Inventors: Vesa Juhani Nissinen, 30 Dovecot Park, Linlithgow, West Lothian, EH49 7LH (GB); Jason Jasminder Mann, 13139-63A Avenue, Surrey, British Columbia V3X 2E4 (CA); Scott Sneddon, 63 Elderslea Road, Carluke, Lanarkshire ML8 4LH (GB)

(*) Notice: Under 35 U.S.C. 154(b), the term of this patent shall be extended for 0 days.

(21) Appl. No.: 09/355,594
(22) PCT Filed: Jan. 15, 1998
(86) PCT No.: PCT/GB98/00131
§ 371 Date: Oct. 29, 1999
§ 102(e) Date: Oct. 29, 1999
(87) PCT Pub. No.: WO98/33393
PCT Pub. Date: Aug. 6, 1998

(30) Foreign Application Priority Data

Jan. 30, 1997 (GB) .................................................. 9701896

(51) Int. Cl.⁷ ....................................................... A23K 1/18
(52) U.S. Cl. ........................... 426/89; 429/103; 429/805; 429/807
(58) Field of Search ............................. 426/89, 103, 807, 426/805

(56) References Cited

U.S. PATENT DOCUMENTS 4,252,831 * 2/1981 Gleckler ................................. 426/74

FOREIGN PATENT DOCUMENTS

| 27 53 416 A1 | 5/1979 | (DE) . |
| 0 292 052 A2 | 11/1988 | (EP) . |
| 457953 * | 11/1991 | (EP) . |
| 0 457 953 A1 | 11/1991 | (EP) . |
| 2 232 573 | 12/1990 | (GB) . |
| 2296851 * | 7/1996 | (GB) . |
| 2 296 851 | 7/1996 | (GB) . |
| 8500722274 * | 2/1987 | (JP) . |
| 91/1110 * | 8/1991 | (WO) . |
| 91/11110 | 8/1991 | (WO) . |
| 97/22265 | 6/1997 | (WO) . |

OTHER PUBLICATIONS

Whiting, British Sugar Beet Review, vol. 62, (1) p. 47, 1994.*
Anmaitre, Journees de la Recherche Porcine eu France Meeting Info, pp 169–176, Publisher: Institut Technique du Porc, Paris, 1975.*
Database WPI, Section Ch, Week 8712, Derwent Publications Ltd., Class C03, AN 87–084094, XP002062276 & JP 62 036 152 A (Nichiden Kagaku), Feb. 17, 1987.

* cited by examiner

Primary Examiner—Chhaya D. Sayala
(74) Attorney, Agent, or Firm—Ratner & Prestia

(57) ABSTRACT

The present invention provides a method of improving the sinkability of fish pellets, comprising providing an aqueous solution of sugar at the surface of the pellets. The sugar solution may be applied in a concentration of between 1–10%, under vacuum or at ambient pressure and with or without the addition of natural oils. Ideally the sugar solution contains sucrose and a beet molasses product is the preferred choice of a sugar containing solution.

7 Claims, 1 Drawing Sheet

METHOD FOR IMPROVING THE SINKABILITY OF FISH FOOD PELLETS

This invention relates to a method of improving the sinkability of fish food pellets.

Certain types of fish, such as salmon, are now farmed for human consumption rather than caught solely by conventional fishing techniques. The farms include netted or otherwise segregated enclosures, which can be freshwater or seawater, and which contain the fish. The food for the fish is supplied by the fish farmer, sometimes in the form of pellets, which are regularly distributed into the enclosures.

Difficulties can arise when the fish food pellets float on the surface of the water for an appreciable amount of time, instead of sinking under the surface where they are then consumed by the fish. The floating pellets can be problematical for several reasons.

Firstly the floating pellets can be carried away by water currents, causing the farmer to have to use more food than is necessary to feed the fish. Secondly, not all fish are surface feeders and they may not take food from the surface of the water. Thirdly the floating food may attract other opportunist feeders such as seagulls; not only can this result in loss of the fish food but also the presence of the birds can scare the fish.

The two main causes of floating are water surface tension and pellet density. It has been thought for a long time that floating can be attributed solely to pellet density but more recently it has become clear that surface tension is also a major issue.

The issue of pellet density at first glance appears to be quite straightforward. If it is assumed that the density of freshwater is 1 $g/cm^3$ then it seems logical to conclude that any object which has a density of more than 1 $g/cm^3$ would sink in freshwater. Typically the density of fish food pellets is approximately 1.2 $g/cm^3$, so naturally the food should sink in water.

However, the effective density of the fish food pellet may vary. For example, current manufacturing techniques can cause the surface of the pellets to be coarse and have a plurality of small crevices, wherein small pockets of air can be trapped. This gives the pellet a buoyancy that prevents it sinking, leaving it floating on the surface. The overall shape of the pellet may affect its ability to trap air; concave surfaces trap air more readily than convex surfaces.

Also it should be considered that seawater and even freshwater contain some dissolved minerals, which increase the density of the liquid medium. The density of the water can easily be increased by as much as 5%. If it is also considered that typically it is only the average density of the fish food pellets that is 1.2 $g/cm^3$ and that the density of some of the pellets may be below 1.2 $g/cm^3$, then it can be seen that a high salt water content may prevent the food pellet sinking. Further, low temperatures can slightly increase the density of the liquid medium.

Another factor opposing the sinking of the food pellet is the surface tension of the water. It has been found that in cold climates, which are typical of the places around the world where fish are farmed, the surface tension of the water is greater than in warmer climes. The pellet can be held by the surface tension of the water, at or just below the water's surface, and all the problems of floating food pellets are incurred. As the food pellets typically contain lipids, whether plant or animal in origin, the surface of the food pellets can be significantly hydrophobic. This property enhances the effect of the surface tension of the water.

The problem of surface tension can be enhanced by or act in concert with the previously mentioned problem of air pockets on the surface of the pellet. In the initial distribution of the pellet, air pockets that are trapped can mean that the pellet floats near the surface of the water. Once near the surface the pellet can be held by the surface tension of the water, so that even if the pockets of air later dissipate the pellet still floats.

The problem of surface tension can increase if the pellets produced from a certain batch are of poor quality. In this case poor quality means that the pellets are smaller in size or weight, or less dense, than they ought to be. The problems that have been described can be particularly predominant when the pellets produced are smaller in size than they ought to be. In this case the surface area to volume ratio of the pellet is increased disproportionately as are the problems caused by the surface of the pellet.

According to the present invention there is provided a method of improving the sinkability of -fish pellets, comprising providing an aqueous solution of a sugar at the surface of the pellets.

Preferably the sugar solution is provided in a coating at the surface of the pellets. The solution may be included preferably in an amount of 1 to 10 percent, most preferably 2 to 6 percent.

The sugar is preferably sucrose, and an especially effective solution is in the form of molasses or a by product thereof.

The invention also provides fish feed pellets comprising nutrients, the feed pellets having a coating of sugar solution.

Preferably the sugar solution is an aqueous solution comprising between 1 and 10 percent sugar.

Preferably the coating also comprises between 5 and 40 percent oil.

In one particular embodiment the invention comprises a first coating of 15.5% fish oil and a second coating of 2 percent sugar beet condensed by product (CSB).

Embodiments of the present invention will now be described by way of illustration in the following Examples and with reference to the accompanying Figure

DETAILED DESCRIPTION

Figure 1:
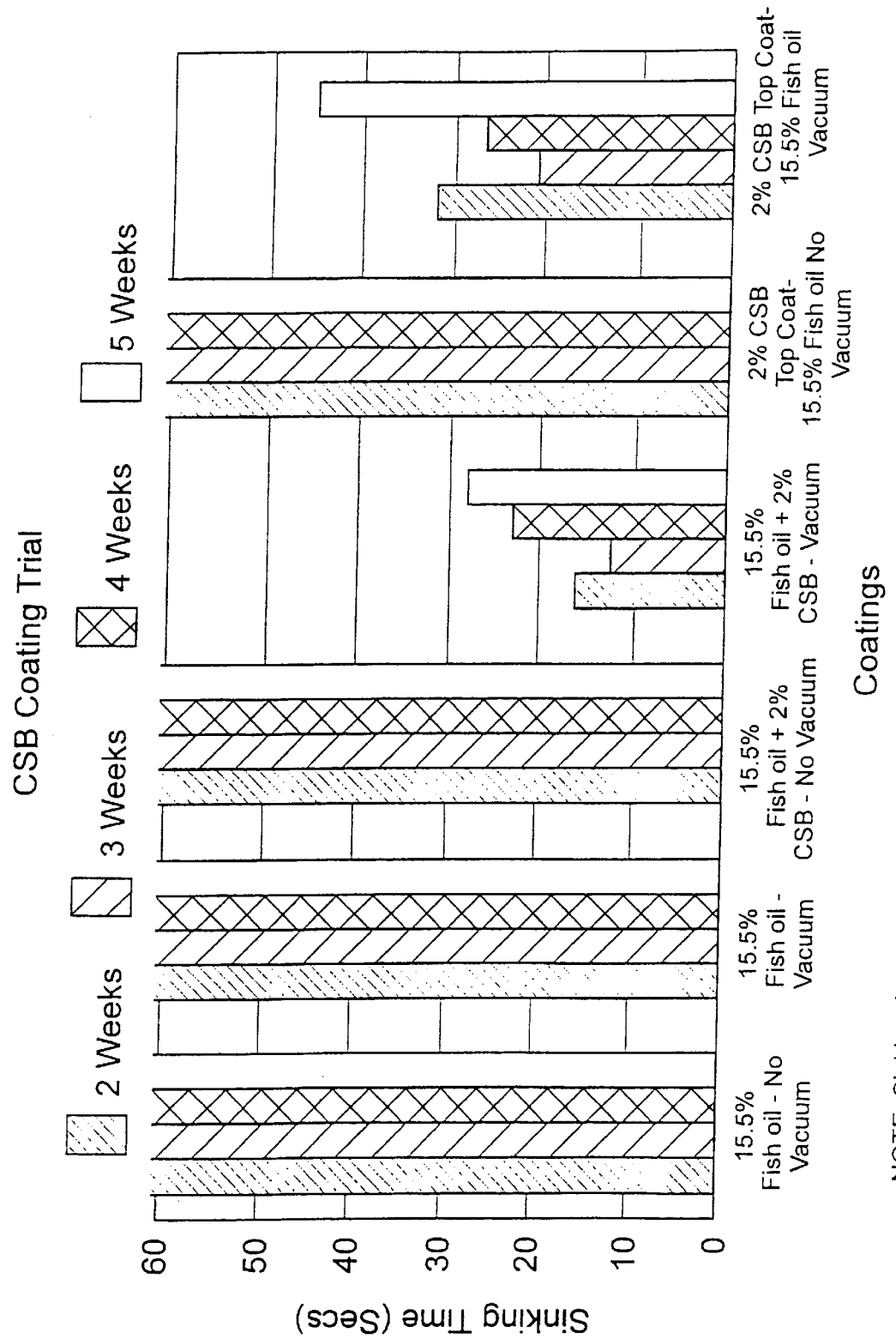
FIG. 1 illustrates sinking time for CSB coated feed pellets.

In the following Examples two techniques were used to test fish food pellets for sinkability. The procedures are as follows:

(A) Spoon Test

This test was designed to measure how effective the pellet surface is in promoting sinking. A sample of 50 pellets are laid down on a water surface with a spoon. They are not dropped through any distance. Most small feed will stay on the surface if applied in such a manner due to surface tension. The number of pellets floating after the indicated time period is recorded.

(B) Field Float Test

A specific amount of feed sample is measured out and dropped into the ocean from a height of at least 30 centimeters. The number of pellets floating after 20 seconds is recorded. This is because floating on the ocean is not usually time dependent. A pellet that floats after 20 seconds will generally remain floating.

In the following Examples two different kinds of fish oil are used in the production of the fish food pellets. The oil that is included in some of the fish food pellets is simply menhaden oil. The oil that is included in the remainder of the pellets is "winterized" menhaden oil. Oil that has undergone the winterization step has had all of the high melting point particles removed so that the oil is clear and remains a liquid at low temperatures.

EXAMPLE 1
Molasses Influence Upon Fish Food Pellet Sinkability

Fish oil coated pellets from EWOS Ltd. Westfield were coated with 2% Pellacoat (a United Molasses low viscosity cane molasses product) The sinkability of these pellets was compared with the sinkability of uncoated pellets, as a control, using the spoon test with the test solution containing 5% salt and maintained at 2–3° C. The data for the length, weight and time taken for the non-coated and coated pellets to sink is shown in Table 1 and Table 2 respectively.

Tables 1 and 2: The tables show the length and weight of molasses non-coated and coated fish food pellets and the time taken in seconds for each pellet to sink in 5% salt solution at 2–3° C.

TABLE 1

| Pellet No. | Length mm | Weight g | Floating Test s/sec |
|---|---|---|---|
| 1 | 4.54 | 0.2598 | 600 |
| 2 | 5.64 | 0.3307 | 4 |
| 3 | 5.48 | 0.3013 | 600 |
| 4 | 5.74 | 0.3268 | 0 |
| 5 | 5.62 | 0.3007 | 60 |
| 6 | 5.80 | 0.3276 | 0 |
| 7 | 6.33 | 0.3338 | 0 |
| 8 | 5.89 | 0.3225 | 0 |
| 9 | 5.72 | 0.27 | 90 |
| 10 | 6.04 | 0.3154 | 4 |
| Mean | 5.68 | 0.30886 | |
| | 0.443 | 0.0259 | |
| STD (%) | 7.8 | 8.4 | |

Correlations

| | Length | Weight |
|---|---|---|
| Floating Test | −0.7749 | −0.6581 |

TABLE 2

| Pellet No | Length mm | Weight g | Floating Test s/sec |
|---|---|---|---|
| 21 | 5.39 | 0.3063 | 0 |
| 22 | 5.55 | 0.3118 | 0 |
| 23 | 5.75 | 0.3439 | 0 |
| 24 | 5.86 | 0.3244 | 0 |
| 25 | 5.77 | 0.305 | 4 |
| 26 | 5.61 | 0.311 | 0 |
| 27 | 6.10 | 0.3123 | 0 |
| 28 | 5.57 | 0.3016 | 21 |
| 29 | 5.99 | 0.3381 | 0 |
| 30 | 5.04 | 0.2547 | 25 |
| Mean | 5.663 | 0.31091 | |
| | 0.290 | 0.0243 | |
| STD (%) | 5.1 | 7.8 | |

Correlations

| | Length | Weight |
|---|---|---|
| Floating Test | −0.6458 | −0.7725 |

EXAMPLE 2

The Influence of Oil and Molasses Upon Fish Food Pellet Sinkability at Various Temperatures and Water Salt Content Fish food pellets were-prepared using winterized and non-winterized oil in coating. A portion of each type was coated with 3% Beet-Molasses Condensed Separation by-product (CSB) from Finnsugar Bioproducts. Each group of pellets was then divided into four samples, which were stored at different temperatures; 0° C., −8° C., 8° C. and 18° C. The fish food pellets were tested for sinkability at various water temperatures and water salt content using the spoon method. Tables 3–7 show the percentage of each type of fish food pellet floating in the different solutions after 30 seconds.

Table 3: Various Temperatures (0–18° C.) and Salt Water Content (0–11%)

TABLE 3

Various Temperatures (0–18° C.) and Salt Water Content (0–11%)

| SAMPLE | % 18° C. Float Salt 6% | % 10° C. Float Salt 6% | % 0° C. Float Salt 6% | % 18° C. Float Salt 0% | % 18° C. Float Salt 11% |
|---|---|---|---|---|---|
| Winterized oil w/3% CSB −8° C. Feed | 0% | 0% | 4% | 0% | 0% |
| Winterized oil −8° C. Feed | 56% | 98% | 100% | 24% | 96% |
| Winterized oil 8° C. Feed | 78% | 100% | 100% | 74% | 98% |
| Winterized oil 18° C. Feed | 84% | 92% | 100% | 74% | 92% |
| Regular oil w/ 3% CSB −8° C. Feed | 0% | 16% | 34% | 8% | 6% |
| Regular oil 8° C. Feed | 100% | 100% | 100% | 100% | 100% |
| Regular oil 8° C. Feed | 100% | 100% | 100% | 100% | 100% |
| Regular oil | 100% | 100% | 100% | 100% | 100% |

TABLE 4

6% Salt and 17° C.

| Sample | % Floating 15 sec | % Floating 30 sec | % Floating 45 sec | % Floating 60 sec |
|---|---|---|---|---|
| Wint. −8° C. w/3% CSB | 2% | 0% | 0% | 0% |
| Reg. −8° w/3% CSB | 12% | 4% | 0% | 0% |
| Wint. −8° C. | 98% | 84% | 56% | 34% |
| Reg. −8° C. | 100% | 100% | 100% | 98% |
| Wint. 8° C. | 100% | 94% | 78% | 74% |
| Reg. 8° C. | 100% | 100% | 100% | 100% |
| Wint. 18° C. | 100% | 90% | 84% | 84% |
| Reg. 18° C. | 100% | 100% | 100% | 100% |

TABLE 5

6% Salt and 11° C.

| Sample | % Floating 15 sec | % Floating 30 sec | % Floating 45 sec | % Floating 60 sec |
|---|---|---|---|---|
| Wint. -8° C. w/3% CSB | 18% | 2% | 0% | 0% |
| Reg. -8° C. w/3% CSB | 78% | 20% | 16% | 8% |
| Wint. -8° C. | 100% | 100% | 98% | 96% |
| Reg. -8° C. | 100% | 100% | 100% | 100% |
| Wint. 8° C. | 100% | 100% | 100% | 94% |
| Reg. 8° C. | 100% | 100% | 100% | 100% |
| Wint. 18° C. | 100% | 92% | 92% | 92% |
| Reg. 18° C. | 100% | 100% | 100% | 100% |

TABLE 6

0% Salt and 17° C.

| Sample | % Floating 15 sec | % Floating 30 sec | % Floating 45 sec | % Floating 60 sec |
|---|---|---|---|---|
| Wint. -8° C. w/3% CSB | 0% | 0% | 0% | 0% |
| Reg. -8° C. w/3% CSB | 10% | 8% | 8% | 2% |
| Wint. -8° C. | 100% | 60% | 24% | 10% |
| Reg. -8° C. | 100% | 100% | 100% | 100% |
| Wint. 8° C. | 100% | 86% | 74% | 50% |
| Reg. 8° C. | 100% | 100% | 100% | 100% |
| Wint. 18° C. | 90% | 82% | 74% | 62% |
| Reg. 18° C. | 100% | 100% | 100% | 100% |

TABLE 7

11% Salt and 17° C.

| Sample | % Floating 15 sec | % Floating 30 sec | % Floating 45 sec | % Floating 60 sec |
|---|---|---|---|---|
| Wint. -8° C. w/3% CSB | 12% | 0% | 0% | 0% |
| Reg. -8° C. w/3% CSB | 20% | 16% | 6% | 2% |
| Wint. -8° C. | 100% | 98% | 96% | 94% |
| Reg. -8° C. | 100% | 100% | 100% | 100% |
| Wint. 8° C. | 100% | 100% | 98% | 96% |
| Reg. 8° C. | 100% | 100% | 100% | 100% |
| Wint. 18° C. | 100% | 100% | 92% | 88% |
| Reg. 18° C. | 100% | 100% | 100% | 100% |

EXAMPLE 3

Different Molasses Influence Upon Fish Food Pellet Sinkability

Fish food pellets were coated with a 3.5% solution of various Molasses and tested for sinkability using both the spoon and field float method. The results of the tests are shown in the tables below.

TABLE 8

Type of molasses coating and the percentage of each type of fish food pellets floating after a field float test. The product flow characteristics of each type of coated pellet are also shown.

| MOLASSES TYPE | % FLOATING | PRODUCT FLOW CHARACTERISTICS |
|---|---|---|
| FOOD-GRADE CANE | 4% | STICKY |
| FEED-GRADE CANE | 3% | STICKY |
| FEED-GRADE BEET CSB | 2% | NOT AS STICKY |
| FEED-GRADE MIXTURE OF CSB BEET/CANE | 4% | NOT AS STICKY |
| CONTROL | 15% | N/A |

TABLE 9

Types of molasses coating and the percentage of each type of fish food pellets floating after 30 seconds in a spoon test. The pellets were stored for 5 and 10 days respectively before testing.

| MOLASSES TYPE | % FLOATING 5 DAYS | % FLOATING 10 DAYS |
|---|---|---|
| FEED-GRADE CANE | 6% | 44% |
| FEED-GRADE BEET CSB | 0% | 12% |
| FEED-GRADE MIXTURE OF CSB BEET/CANE | 8% | 24% |
| CONTROL | 100% | 98% |

EXAMPLE 4

The influence of Fish Oil, CSB and Vacuum Processing Upon Fish Food Pellet Sinkability.

Fish food pellets were Prepared using fish oil as coating. In some cases the fish oil was applied under vacuum conditions and in some cases 2% CSB was also used as a coating supplement. The six different coating treatments of the dry base Feed pellets are shown below.

Feed 1: 15.5% fish oil only without vacuum.
Feed 2: 15.5% fish oil only under vacuum.
Feed 3: 15.5% fish oil plus 2% CSB mixture without vacuum.
Feed 4: 15.5% fish oil plus 2% CSB mixture under vacuum.
Feed 5: 15.5% fish oil without vacuum, as a first coating, followed by 2% CSB top-coating without vacuum.
Feed 6: 15.5% fish oil under vacuum, as a first coating, followed by 2% CSB top-coating without vacuum.

The fish food pellets were tested for sinkability using the spoon method. FIG. 1 shows the sinking time of each type of fish food pellet. As can be seen feeds 4 and 6 provide the best sinkability. Note that a sinking time greater than 60 seconds indicates that most of the pellets remain floating.

The tests have all showed that the application of molasses as a surface coating onto fish food pellets greatly enhances the sinkability of the pellets. Typically the tests show that all or almost all of the fish food pellets sink within 30 seconds. These results are in direct comparison to the non-coated pellets, which can take up to 600 seconds to sink (as shown in Table 1) and which show little or no sinking within 30 seconds (as shown in Tables 3–7).

Notably the molasses coating on the pellets still proves to be effective as the conditions of the water medium are made more extreme. Even with a significant salt water content, all of the coated pellets sink within 30 seconds (as shown in Table 3). Also as the temperature of the water media is lowered to 0° C., which is much colder than average fish farm water temperature, and which causes the water surface tension to increase significantly, the molasses coating still leads to the majority of the pellets sinking within 30 seconds, when all of the non-coated pellets remain floating.

Detailed Analysis of Cane Molasses sample

|  | Feed Grade | 100% Dry Matter |
|---|---|---|
| Dry Matter | 72% | 100% |
| Ash | 10% | 13.9% |
| Crude Fiber | 0% | 0% |
| Ether Extract | 0% | 0% |
| N-Free Extract | 65% | 87.5% |
| Protein (NX6.25) | 3% | 4.2% |
| Total Sugars as Invert | 46% | 63.9% |
| Brix | 79.5 Degree | |
| Minerals | | |
|  | Feed Grade | 100% Dry Matter |
| Calcium | .81% | 1.12% |
| Chlorine | 2.86% | 3.97% |
| Cobalt | .42 MG/# | .58 MG/# |
| Copper | 28 MG/# | 38.88 MG/# |
| Iron | .019% | .026% |
| Magnesium | .35% | .486% |
| Manganese | .20 MG/# | 27.7 MG/# |
| Phophorous | .08% | .11% |
| Potassium | 2.4% | 3.35% |
| Sodium | .17% | .236% |
| Sulphur | 1.15% | 1.60% |
| Vitamins | | |
|  | Feed Grade | 100% Dry Matter |
| Choline | 350 MG/# | 486 MG/# |
| Niacin | 15 MG/# | 20.35 MG/# |
| Pantothenic Acid | 17 MG/# | 23.61 MG/# |
| Riboflavin | 1 MG/# | 1.59 MG/# |
| Thiamine | .4 MG/# | 55 MG/# |
| Biotin | .32/# MICROGRAMS | .44/# MICROGRAMS |
| Folic Acid | .05 MG/# | .069 MG/# |
| Pyridoxine | 3 MG/# | 4.17 MG/# |

Of the different types of molasses tested feed-grade beet molasses CSB was shown to be the best type of molasses used, in both the field float and the spoon tests (as shown in Tables 8 and 9). It should also be noted that although feed-grade beet molasses proved to be slightly better than the other types of molasses coating it was considerably better than the non-coated pellets in the sinking tests. CSB molasses is a by-product from beet production, having the following characteristics:

(Analysis of Feed-Grade Beet Molasses CSB)

| Dry Matter: | about 70% |
|---|---|
| Moisture: | about 30% |
| Protein*: | about 17% |
| Ash*: | about 23% |
| Invert sugars*: | about 20% |
| Viscosity (cP): | about 3000 |

(*Percentage on dry matter basis)

The application of the coating of beet molasses also has other benefits in that not only is it thin and easy to apply, with Example 4 showing that the coating is more effective when applied under vacuum, but also produces pellets that flow easily, and which produce considerably less dust than non-coated pellets. The coating of beet molasses can increase the palatability of the pellet.

What is claimed is:

1. A method of improving the sinkability of fish pellets, comprising providing an aqueous solution of a sugar at the surface of the pellets.

2. A method of improving the sinkability of fish pellets as claimed in claim 1, wherein the aqueous sugar solution is between 1–10% concentration.

3. A method of improving the sinkability of fish pellets as claimed in claim 1 or 2, wherein the aqueous sugar solution is between 2–6% concentration.

4. A method of improving the sinkability of fish pellets as claimed in claim 1, wherein the sugar solution used is sucrose based.

5. A method of improving the sinkability of fish pellets as claimed in claim 1 or 4, wherein molasses is used as the sugar solution.

6. A method of improving the sinkability of fish pellets as claimed in claim 1 or 4, wherein beet molasses is used as the sugar solution.

7. A method of improving the sinkability of fish pellets as claimed in claim 1 or 4, and wherein the sugar solution is a sugar beet condensed separation by-product (CSB).

* * * * *